United States Patent
Smith et al.

(10) Patent No.: US 11,054,349 B2
(45) Date of Patent: Jul. 6, 2021

(54) METHOD FOR PREPARATION OF DRIED BLOOD SAMPLE FOR MULTIPLEXING OF ANALYTES

(71) Applicant: Alcala Pharmaceutical, Inc., San Diego, CA (US)

(72) Inventors: David J. Smith, San Diego, CA (US); Matthew D. Rifat, San Diego, CA (US); Christian Tagwerker, Oceanside, CA (US); Irfan Baig, San Diego, CA (US); Ranulu Samanthi de Zoysa, Escondido, CA (US); Eric J. Brunson, San Diego, CA (US)

(73) Assignee: ALCALA PHARMACEUTICAL, INC., San Diego, CA (US)

( * ) Notice: Subject to any disclaimer, the term of this patent is extended or adjusted under 35 U.S.C. 154(b) by 0 days.

(21) Appl. No.: 16/861,554

(22) Filed: Apr. 29, 2020

(65) Prior Publication Data
US 2020/0256772 A1    Aug. 13, 2020

Related U.S. Application Data

(63) Continuation of application No. 16/281,932, filed on Feb. 21, 2019, now Pat. No. 10,656,059.
(Continued)

(51) Int. Cl.
*A61L 2/10* (2006.01)
*G01N 1/38* (2006.01)
(Continued)

(52) U.S. Cl.
CPC ............... *G01N 1/38* (2013.01); *G01N 30/06* (2013.01); *G01N 30/7233* (2013.01); *G01N 2001/386* (2013.01)

(58) Field of Classification Search
USPC ........................................ 250/282
See application file for complete search history.

(56) References Cited

U.S. PATENT DOCUMENTS

| 4,292,250 A | 9/1981 | DeLuca et al. |
| 4,478,936 A | 10/1984 | Herlihy |

(Continued)

FOREIGN PATENT DOCUMENTS

| AU | 2018229451 A1 | 10/2018 |
| BR | 112018004295 A2 | 10/2018 |

(Continued)

OTHER PUBLICATIONS

Boons, Christel, C.L.M. et al., "Feasibility of and patients' perspective on nlontinib dried blood spot self-sampling", Eur J Clin Pharmacol, Feb. 7, 2019, Springer.
(Continued)

*Primary Examiner* — Phillip A Johnston
(74) *Attorney, Agent, or Firm* — Roeder & Broder LLP; James P. Broder (57) ABSTRACT

A method for preparation of a dried blood sample for multiplexing of analytes includes the steps of mixing an Internal Standard solution with a first diluent in a vessel, the Internal Standard solution including a plurality of different Internal Standards, adding the dried blood sample to the vessel, sonicating the vessel containing the Internal Standard solution, the first diluent and the dried blood sample, and removing the dried blood sample from the vessel. The Internal Standard solution can include a plurality of Internal Standards. The Internal Standard solution can include at least 15 Internal Standards. The dried blood sample can be generated using less than 50 μL of blood. The dried blood
(Continued)

sample can be generated using less than 10 μL of blood. The first diluent can include methanol or a mixture of water and methanol.

21 Claims, 4 Drawing Sheets

Related U.S. Application Data (60) Provisional application No. 62/639,713, filed on Mar. 7, 2018.

(51) Int. Cl.
  *G01N 30/06* (2006.01)
  *G01N 30/72* (2006.01)

(56) References Cited

U.S. PATENT DOCUMENTS

| | | | |
|---|---|---|---|
| 4,816,224 A | 3/1989 | Vogel et al. | |
| 5,273,885 A | 12/1993 | Visor et al. | |
| 5,427,953 A | 6/1995 | Yee | |
| 5,508,200 A | 4/1996 | Tiffany et al. | |
| 5,516,487 A | 5/1996 | Rosenthal et al. | |
| 7,109,038 B2 | 9/2006 | Scholl et al. | |
| 7,585,641 B2 | 9/2009 | Bandla et al. | |
| 7,618,827 B2 | 11/2009 | Steven | |
| 7,837,939 B2 | 11/2010 | Tung et al. | |
| 8,202,686 B2 * | 6/2012 | Pamula | C12Q 1/34 435/4 |
| 8,476,414 B2 * | 7/2013 | Cerda | G01N 33/6848 536/17.9 |
| 8,710,429 B2 | 4/2014 | Hanas et al. | |
| 9,012,835 B2 | 4/2015 | Soldin et al. | |
| 9,234,894 B2 * | 1/2016 | La Marca | H01J 49/0459 |
| 9,512,413 B2 * | 12/2016 | Hansen | A62D 3/02 |
| 9,546,979 B2 | 1/2017 | Cooks et al. | |
| 9,575,064 B2 | 2/2017 | Potier | |
| 9,795,960 B2 | 10/2017 | Maillefer et al. | |
| 10,141,171 B2 | 11/2018 | La Marca et al. | |
| 10,262,112 B2 | 4/2019 | Ryan | |
| 10,656,059 B2 * | 5/2020 | Smith | G01N 1/38 |
| 2004/0014059 A1 | 1/2004 | Liew | |
| 2008/0102535 A1 * | 5/2008 | Chace | G01N 33/96 436/173 |
| 2008/0195062 A1 | 8/2008 | Caprioli | |
| 2009/0136942 A1 | 5/2009 | Kopreski | |
| 2012/0107951 A1 | 5/2012 | Grenz et al. | |
| 2014/0373644 A1 | 12/2014 | Iraneta et al. | |
| 2017/0071520 A1 | 3/2017 | Rudge et al. | |
| 2017/0199203 A1 | 7/2017 | Britz-McKibbin | |
| 2017/0248607 A1 | 8/2017 | Cooks et al. | |
| 2018/0135128 A1 | 5/2018 | Sanders et al. | |
| 2018/0196074 A1 | 7/2018 | Bitenc et al. | |
| 2018/0348194 A1 | 12/2018 | Boeser et al. | |

FOREIGN PATENT DOCUMENTS

| | | |
|---|---|---|
| CA | 2766635 A1 | 8/2012 |
| CN | 101160122 A | 4/2008 |
| CN | 101318021 B | 12/2010 |
| CN | 102507755 A | 6/2012 |
| CN | 102435688 B | 5/2013 |
| CN | 103169756 B | 7/2014 |
| CN | 104007165 A | 8/2014 |
| CN | 104007217 A | 8/2014 |
| CN | 104277090 A | 1/2015 |
| CN | 103768088 B | 3/2015 |
| CN | 103768132 B | 3/2015 |
| CN | 103105364 B | 6/2015 |
| CN | 103520186 B | 11/2015 |
| CN | 105651901 A | 6/2016 |
| CN | 105954453 A | 9/2016 |
| CN | 106153796 A | 11/2016 |
| CN | 106645500 A | 5/2017 |
| CN | 106666108 A | 5/2017 |
| CN | 106770769 A | 5/2017 |
| CN | 106770802 A | 5/2017 |
| CN | 106841427 A | 6/2017 |
| CN | 106855545 A | 6/2017 |
| CN | 106908554 A | 6/2017 |
| CN | 107144453 A | 9/2017 |
| CN | 106383186 B | 10/2017 |
| CN | 107328872 A | 11/2017 |
| CN | 107462650 A | 12/2017 |
| CN | 107462653 A | 12/2017 |
| CN | 105699572 B | 3/2018 |
| CN | 105954454 B | 3/2018 |
| CN | 108051494 A | 5/2018 |
| CN | 108088934 A | 5/2018 |
| CN | 108169383 A | 6/2018 |
| CN | 108195984 A | 6/2018 |
| CN | 108333268 A | 7/2018 |
| CN | 108362795 A | 8/2018 |
| CN | 108593828 A | 9/2018 |
| CN | 108645924 A | 10/2018 |
| CN | 109001329 A | 12/2018 |
| CN | 109010292 A | 12/2018 |
| CN | 109030672 A | 12/2018 |
| CN | 109030673 A | 12/2018 |
| CN | 109164194 A | 1/2019 |
| CN | 109239212 A | 1/2019 |
| DE | 102011052708 A1 | 2/2013 |
| EP | 1329513 B1 | 12/2011 |
| EP | 2457661 A1 | 5/2012 |
| EP | 2420831 B1 | 10/2015 |
| FR | 2666898 A1 | 3/1992 |
| JP | 03283713 B2 | 5/2002 |
| KR | 1084432 B1 | 11/2011 |
| KR | 2012004736 A | 1/2012 |
| WO | WO2005105040 A2 | 11/2005 |
| WO | WO2008057866 A2 | 5/2008 |
| WO | WO2012174144 A1 | 12/2012 |
| WO | WO2014150900 A1 | 9/2014 |
| WO | WO2017066780 A1 | 4/2017 |
| WO | WO2017157650 A1 | 9/2017 |
| WO | WO2017212348 A1 | 12/2017 |
| WO | WO2018093724 A1 | 5/2018 |

OTHER PUBLICATIONS

World Health Organization, "Use of Dried Blood Spot Specimens for Serological and Virological Testing", WHO Guidelines on Hepatitis B and C Testing, Feb. 13, 2017, Geneva,.

Petrick, Lauren, et al., "An untargeted metabolomics method for archived newborn dried blood spots in epidemiologic studies" Metabolomics, Feb. 3, 2017, Springer Science+Business Media New York.

Freeman, Jeffrey D., et al., "State of the Science in Dried Blood Spots", Clinical Chemistry, Nov. 29, 2017, American Association of Clinical Chemistry.

Drolet, Jeremy, et al., "Integrated Metabolomics Assessment of Human Dried Blood Spots and Urine Strips", Metabolites, Jul. 15, 2017.

Lehmann, Sylvan, et al., "Clinical perspectives of dried blood spot protein quantification using mass spectrometry methods", Critical Reviews in Clinical Laboratory Sciences, Apr. 10, 2017, Taylor and Francis Group.

Zakaria, Rosita, et al., "Advantages and Challenges of Dried Blood Spot Analysis by Mass Spectrometry Across the Total Testing Process", JIFCC, Dec. 1, 2016.

Tre-Hardy, Marie, et al., "Fast method for simultaneous quantification of tamoxifen and metabolites in dried blood spots using an entry level LC-MS/MS system", Clin Biochem, 2016. Elsevier Inc.

Antunes, Marina Venzon, Dried blood spots analysis with mass spectrometry: Potentials and pitfalls in therapeutic drug monitoring, Clin Biochem, May 12, 2016. Elsevier Inc.

Gaissmaier, Tanja, et al., "herapeutic drug monitoring in dried blood spots using liquid microjunction surface sampling and high reso- (56) References Cited

OTHER PUBLICATIONS lution mass spectrometry", Analyst, Jan. 13, 2016. The Royal Society of Chemistry.

Verplaetse, Ruth, et al., "Quantitative determination of opioids in whole blood using fully automated dried blood spot desorption coupled to on-line SPE-LC-MS/MS", Drug Testing and Analysis, Nov. 26, 2015. John Wiley & Sons, Ltd.

Li, Wenkui, et al., "LC-MS/MS bioanalysis of loratadine (Claritin) in dried blood spot (DBS) samples collected by subjects in a clinical research study", Journal of Chromatography B, Jan. 13, 2015. Elsevier B.V.

Jager, Nynke Geeske Lokke, et al, "Procedures and practices for the validation of bioanalytical methods using dried blood spots: a review", Bioanalysis, Sep. 17, 2014.

Sadones, Nele, et al., "Spot them in the spot: analysis of abused substances using dried blood spots", Bioanalysis, Nov. 10, 2014, vol. 6, No. 17. Future Science.

Wagner, Michael, et al., "The use of mass spectrometry to analyze dried blood spots", Mass Spectromety Reviews, Sep. 22, 2014. Wiley Periodicals, Inc.

Mercolini, Laura, et al., "Dried blood spot testing: a novel approach for the therapeutic drug monitoring of ziprasidone-treated patients", Bioanalysis, Jul. 21, 2014, vol. 6, No. 11. Future Science.

Odoardi, Sara, et al., "Simplifying sample pretreatment: application of dried blood spot (DBS) method to blood sample, including postmortem, for UHPLC-MS/MS analysis of drugs of abuse", Forensic Sci Int., Apr. 16, 2014. Elsevier.

Rhoden, Liliane, et al., "Simple procedure for determination of valproic acid in dried blood spots by gas chromatography-mass spectrometry", Journal Pharm Biomed Anal, Apr. 2, 2014. Elsevier.

Rao, Ramisetti Nageswara, "Emerging liquid chromatography-mass spectrometry technologies improving dried blood spot analysis", Expert Rev Proteomics, Apr. 3, 2014. Informa UK Ltd.

Muller, Miriam et al., "Mass Spectrometric Profiling of Vitamin D Metabolites beyond 25-Hydroxyvitamin D." Clinical Chemistry, 2015. vol. 61, Issue 8, pp. 1033-1048.

Lakshmy, Ramakrishnan et al., "Utility of Dried Blood Spots for Measurement of Cholesterol and Triglycerides in a Surveillance Study." Journal of Diabetes Science and Technology, 2010. vol. 4, Issue 2. pp. 258-262.

Volmer, Dietrich et al., "Analysis of Vitamin D Metabolic Markers by Mass Spectrometry: Current Techniques, Limitations of the "Gold Standard" Method, and Anticipated Future Directions." Mass Spectrometry Reviews, 2015. vol. 34, pp. 2-23. Wiley Periodicals, Inc.

Zheng, Xiao-Hong et al., "Simultaneous quantitation of folic acid and 5-methyltetrahydrofolic acid in human plasma by HPLC-MS/MS and its application to a pharmacokinetic study." Journal of Pharmaceutical Analysis, 2015. vol. 5, pp. 269-275. Elsevier B.V.

Qi, Yulin et al., "Activation of Reactive MALDI Adduct Ions Enables Differentiation of Dihydroxylated Vitamin D Isomers." J. Am. Soc. Mass Spectrum, 2017. vol. 28, pp. 2532-2537/.

Holmes, Earle W. et al., "Biotin Interference in Clinical Immunoassays: A Cause for Concern." Arch Pathol Lab Med, 2017. vol. 141, pp. 1459-1460.

Fu, Xiaowei et al., "An Adolescent with Increased Plasma Methylmalonic Acid and Total Homocysteine." Clinical Chemistry, 2017. vol. 63, Issue 6, pp. 1069-1073.

Kozhanova, L.A. et al., "Determination of Water- and Fat-Soluble Vitamins in Multivitamin Preparations by High-Performance Liquid Chromatography." Journal of Analytical Chemistry, 2002. vol. 57, No. 1, pp. 40-45.

Malmauret, L. et al., "Dietary intakes and vitamin status of a sample of homeless people in Paris." European Journal of Clinical Nutrition, 2002. vol. 56, pp. 313-320. Nature Publishing Group.

Uchida, Tomono et al., "γ-Tocopherol is Metabolized Faster than a-Tocopherol in Young Japanese Women." J Nutr Sci Vitaminol, 2018. vol. 64, pp. 399-403.

Lebold, Katie M. et al., "Urinary a-carboxyethyl hydroxychroman can be used as a predictor of a-tocopherol adequacy, as demonstrated in the Energetics Study." Am J Clin Nutr, 2012. vol. 96, pp. 801-809.

Tamblyn, J.A. et al., "Serum and urine vitamin D metabolite analysis in early preeclampsia." Endocrine Connections, 2018. vol. 7, Issue 1, pp. 199-210. Bioscientifica Ltd.

Kim, Linda et al., "Identification of menaquinones (vitamin K2 homologues) as novel constituents of honey." Food Chemistry, 2018. vol. 249, pp. 184-192. Elsevier.

Thijssen, Henk H.W., et al. "Menadione is a metabolite of oral vitamin K". British Journal of Nutrition, 2006, 95, 260-266. The Authors (2006).

Tamblyn, J.A., et al. "Serum and urine vitamin D metabolite analysis in early preeclampsia". Endocrine Connections, 2018, 7:1, 199-210. The Authors (2018).

Stephensen, Charles B., et al. "Vitamin A is excreted in the urine during acute infection". Am J Clin Ntr, 1994, 60, 388-392. American Society for Clinical Nutrition (1994).

Iwakawa, Hiromi, et al. "Concentrations of Water-Soluble Vitamins in Blood and Urinary Excretion in Patients with Diabetes Mellitus". Nutrition and Metabolic Insights, 2016, 9, 85-92. Libertas Academica.

Eng, Wei Kay, et al. "Identification and Assessment of markers of biotin status in healthy adults". British Journal of Nutrition, 2013, 110, 321-329. The Authors (2013).

Chen, Chi-Fen, et al. "Novel Spectrophotometric Method for the Quantitation of Urinary Xanthurenic Acid and Its Application in Identifying Individuals with Hyperhomocysteinemia Associated with Vitamin B6 Deficiency". BioMed Research International, vol. 2013, Article ID 678476, 76 pages. Hindawi Publishing Corporation.

Kok, Miranda G.M., et al. "Targeted metabolomics of whole blood using volumetric absorptive microsampling". Talanta, 2019, 197, 49-58. Elsevier B.V. (2019).

Antelo-Dominguez, Angel, et al., "Simultaneous determination of cocaine and opiates in dried blood spots by electrospray ionization tandem mass spectrometry", Talanta, Sep. 15, 2013. Elsevier.

Meesters, R.J., et al., "State-of-the-art dried blood spot analysis: an overview of recent advances and future trends", Bioanalysis, Nov. 15, 2013. Hipotesis, Apuntes cientifios uniandinos.

Ambach, Lars, et al., "Rapid and simple LC-MS/MS screening of 64 novel psychoactive substances using dried blood spots", Drug Test Anal., Jul. 19, 2013. John Wiley & Sons, Ltd.

Lehmann, Sylvain, et al., "Current and future use of "dried blood spot" analysis in clinical chemistry", Clin Chem Lab Med., Jun. 1, 2013. De Gruyter.

Ismaiel, Omnia A., et al., "Investigation of endogenous blood lipids components that contribute to matrix effects in dried blood spot samples by liquid chromatography-tandem mass spectrometry", Drug Testing and Analysis, Oct. 10, 2012. John Wiley & Sons, Ltd.

Ansari, Marc, et al., "A simplified method for busulfan monitoring using dried blood spot in combination with liquid chromatography/tandem mass spectrometry", Rapid Commun Mass Spectrom., May 4, 2012. John Wiley & Sons, Ltd.

Lawson, Graham, et al., "Quantitative determination of atenolol in dried blood spot samples by LC-HRMS: a potential method for assessing medication adherence", Journal of Chromatography B, Apr. 16, 2012. Elsevier.

Saussereau, E., et al, On-line liquid chromatography/tandem mass spectrometry simultaneous determination of opiates, cocainics and amphetamines in dried blood spots, Journal of Chromatography B, Dec. 2, 2011. Elsevier.

Li, Yuanyuan, et al., Dried blood spots as a sampling technique for the quantitative determination of guanfacine in clinical studies, Bioanalysis, 2011. Future Science Ltd.

Reddy, Todime M., et al., A dried blood spots technique based LC-MS/MS method for the analysis of posaconazole in human whole blood samples, Journal of Chromatography B, Oct. 11, 2011. Elsevier.

Shi, Yifan, et al, "Assay dynamic range for DBS: battles on two fronts", Bioanalysis, Oct. 20, 2011. vol. 3, No. 20. Future Science.

(56) References Cited

OTHER PUBLICATIONS

Abu-Rabie, Paul, et al., "Method of applying internal standard to dried matrix spot samples for use in quantitative bioanalysis", Analytical Chemistry, Oct. 5, 2011. ACS Publications.

Wong, Philip, et al., "Application of automated serial blood sampling and dried blood spot technique with liquid chromatography-tandem mass spectrometry for pharmacokinetic studies in mice", Journal of Pharmaceutical and Biomedical Analysis, Jul. 1, 2011. Elsevier.

Li, Wenkui, et al, "Quantitative analysis of NIM811, a cyclophilin inhibitor, in human dried blood spots using liquid chromatography-tandem mass spectrometry", Journal of Chromatography B, Jun. 26, 2011. Elsevier.

DéGlon, Julien, et al., "Direct analysis of dried blood spots coupled with mass spectrometry: concepts and biomedical applications", Anal Bioanal Chem, Jun. 25, 2011. Springer-Verlag.

Liu, Guowen, et al., "Internal standard tracked dilution to overcome challenges in dried blood spots and robotic sample preparation for liquid chromatography/tandem mass spectrometry assays", Rapid Commun Mass Spectrom., Feb. 21, 2011. John Wiley & Sons, Ltd.

Vu, D.H., et al., "Determination of moxifloxacin in dried blood spots using LC-MS/MS and the impact of the hematocrit and blood volume", Journal of Chromatography B, Mar. 16, 2011. Elsevier.

Mather, Joanne, et a., "Rapid analysis of dried blood spot samples with sub-2-μm LC-MS/MS", Bioanalysis, 2011. Future Science Group.

Liang, Xiaorong, et al., "Human DBS sampling with LC-MS/MS for enantioselective determination of metoprolol and its metabolite O-desmethyl metoprolol", Bioanalysis, 2010. Future Science Ltd.

Spooner, Neil, "A glowing future for dried blood spot sampling", Bioanalysis, 2010. Future Science Ltd.

Patel, Parul, et al., Dexamethasone quantification in dried blood spot samples using LC-MS: The potential for application to neonatal pharmacokinetic studies, Journal of Chromatography B, Oct. 20, 2010. Elsevier.

DéGlon, Julien, et al., "Automated system for on-line desorption of dried blood spots applied to LC/MS/MS pharmacokinetic study of flurbiprofen and its metabolite", Journal of Pharmaceutical and Biomedical Analysis, Aug. 17, 2010. Elsevier.

Li, Fumin, et al, "Liquid chromatography/tandem mass spectrometry sensitivity enhancement via online sample dilution and trapping: applications in microdosing and dried blood spot (DBS) bioanalysis", Rapid Commun Mass Spectrom., Jun. 14, 2010. John Wiley & Sons, Ltd.

Keevil, Brian G., et al., "The analysis of dried blood spot samples using liquid chromatography tandem mass spectrometry", Clinical Biochemistry, Jul. 1, 2010. Elsevier.

Li, Wenkui, et a., "Dried blood spot sampling in combination with LC-MS/MS for quantitative analysis of small molecules", Biomed Chromatogr, Oct. 21, 2009. John Wiley & Sons, Ltd.

Chuang, Chih-Kuang, "A method for lactate and pyruvate determination in filter-paper dried blood spots", Journal of Cromatography A, Oct. 31, 2009. Elsevier.

Damen, Carola W.N., et al., "Application of dried blood spots combined with high-performance liquid chromatography coupled with electrospray ionisation tandem mass spectrometry for simultaneous quantification of vincristine and actinomycin-D", Anal Bioanal Chem, Apr. 24, 2009. Springer.

Liang, Xiaorong, et al., "Study of dried blood spots technique for the determination of dextromethorphan and its metabolite dextrorphan in human whole blood by LC-MS/MS", Journal of Chromatography B, Feb. 11, 2009. Elsevier.

Abdel-Rehim, Mohamed, et al., "MEPS as a rapid sample preparation method to handle unstable compounds in a complex matrix: determination of AZD3409 in plasma samples utilizing MEPS-LC-MS-MS", Journal of Chromatographic Science, Jul. 2008.

McDade, Thomas W., et al., "What a drop can do: dried blood spots as a minimally invasive method for integrating biomarkers into population-based research", Demography, Nov. 4, 2007.

Olshan, Andrew F., "Meeting report: the use of newborn blood spots in environmental research: opportunities and challenges", Environ Health Perspect., Dec. 2007.

Slawson, Matthew H., et al, "Quantitative analysis of naltrexone and 6beta-naltrexol in human, rat, and rabbit plasma by liquid chromatography-electrospray ionization tandem mass spectrometry with application to the pharmacokinetics of Depotrex in rabbits", Journal of Analytical Toxicology, Oct. 2007.

Wuyts, Birgitte, et al., "Critical sample pretreatment in monitoring dried blood spot citrulline", Clin Chim Acta., Jul. 19, 2007. Elsevier.

McCann, Steven J., et al., "Measurement of total homocysteine in plasma and blood spots using liquid chromatography-tandem mass spectrometry: comparison with the plasma Abbott IMx method", The Association of Clinical Biochemists, 2003.

Keevil, Brian G., et al., "Simultaneous and rapid analysis of cyclosporin A and creatinine in finger prick blood samples using liquid chromatography tandem mass spectrometry and its application in C2 monitoring", Therapeutic Drug Monitoring, Dec. 2002.

Li, Wenkui, et al., "Dried blood spot sampling in combination with LC-MS/MS for quantitative analysis of small molecules", Biomedical Chromatography, 2010. John Wiley & Sons, Ltd.

D'Avolio, Antonio, et al., "HPLC-MS method for the quantification of nine anti-HIV drugs from dry plasma spot on glass filter and their long term stability in different conditions", Journal of Pharmaceutical and Biomedical Analysis, Feb. 25, 2010. Elsevier.

Santos Joana, et al. "Sequential determination of fat-and water-soluble vitamins in green leafy vegetables during storage." Journal of Chromatography, 2012, pp. 179-188.

Vazquez R., et al. "Simultaneous quantification of water-soluble and fat-soluble vitamins in parenteral nutrition admixtures by HPLC-UV-MS/MS." Eur J Hosp Pharm Sci., 2009. vol. 15, Issue 2, pp. 28-35. Pharma Publishing and Media Europe.

Phinney, Karen W., et al. "Isotope dilution liquid chromatography-mass spectrometry methods for fat-and water-soluble vitamins in nutritional formulations." Analytical Chemistry, 2011. vol. 83, Issue 1, pp. 92-98.

Wagner, Dennis, (edited by R. Eitenmiller et al) "Vitamin Analysis for the Health and Food Sciences." Book Reviews/Trends in Food Science & Technology, 2009. vol. 20, pp. 598-599.

Aquel, A. et al "Vitamin Analysis in Food by UPLC-MS." M., Naushad & MR, Khan (Eds.), Ultra Performance Liquid Chroatography Mass Spectrometry Evaluation and Application in Food Analysis, 2014, pp. 243-278.

Midttun, Øivind, et al. "Multianalyte quantification of vitamin B6 and B2 species in the nanomolar range in human plasma by liquid chromatography—tandem mass spectrometry." Clinical Chemistry, 2005. vol. 51, Issue 7, pp. 1206-1216.

Albahrani, A. A. et al., "Fat-Soluble Vitamins: Clinical Indications and Current Challenges for Chromatographic Measurement." Clin Biochem Rev. 37, 2016, pp. 27-47.

West, Charles D. et al., "Thin-Layer chromatography for thyroid hormones." Analytical Biochemistry, 1965. vol. 12, Issue 1, pp. 41-48. Elsevier.

Weltring, A. et a., "Simultaneous measurement of endogenous steroid hormones and their metabolites with LC-MS/MS in faeces of a New World primate species, Cebus capucinus." Physiology & Behavior, 2011, vol. 105, pp. 510-521. Elsevier.

Blount, Benjamin et al., "Folate deficiency causes uracil misincorporation into human DNA and chromosome breakage: Implications for cancer and neuronal damage." Proc. Natl. Acad. Sci. USA, 1997. vol. 94, pp. 3290-3295.

Harrington, Dominic J. et al., "Determination of the urinary aglycone metabolites of vitamin K by HPLC with redox-mode electrochemical detection." Journal of Lipid Research, 2005. vol. 46, pp. 1053-1060.

Klee, George G., "Cobalamin and Folate Evaluation: Measurement of Methylmalonic Acid and Homocysteine vs Vitamin B12 and Folate." Clinical Chemistry, 2000. vol. 46, pp. 1277-1283.

Ohkawa, Hiroshi et al., "New Metabolites of Riboflavin Appeal in Human Urine." The Journal of Biological Chemistry, 1993. vol. 258, No. 9, pp. 5623-5628.

(56) References Cited

OTHER PUBLICATIONS

Norman, E.J. et al., "Transfer of Nucleated Maternal Cells into Fetal Circulation During the Second Trimester of Pregnancy." British Journal of Haematology, 1998. vol. 100, pp. 605-618.

Cansu, Ali et al., "The Evaluation of Thyroid Functions, Thyroid Antibodies, and Thyroid Volumes in Children with Epilepsy during Short-Term Administration of Oxcarbazepine and Valproate." Epilepsia, 2006. vol. 47, pp. 1855-1859. Blackwell Publishing, Inc.

Magera, Mark et al., "Method for Determination of Total Homocysteine Plasma in Plasma and Urine by Stable Isotope Dilution and Electrospray Tandem Mass Spectrometry." Clinical Chemistry, 1999. vol. 45, Issue 9, pp. 1517-1522.

Shibata, Katsumi et al., "Values of Water-Soluble Vitamins in Blood and Urine of Japanese Young Men and Women Consuming a Semi-Purified Diet Based on the Japanese Dietary Reference Intakes." J Nutr Sci Vitaminol, 2005. vol. 51, pp. 319-328.

Hannisdal, Rita et al., "Liquid Chromatography-Tandem Mass Spectrometry Analysis of Folate and Folate Catabolites in Human Serum." Clinical Chemistry, 2009. vol. 55, Issue 6, pp. 1147-1154.

Tsuji, T. et al., "Twenty-four-hour urinary water-soluble vitamin levels correlate with their intakes in free-living Japanese university students." European Journal of Clinical Nutrition, 2010. vol. 64, pp. 800-807. Macmillan Publishers Limited.

Fukuwatari, Tsutomu et al., "Urinary Water-Soluble Vitamins and Their Metabolite Contents as Nutritional Markers for Evaluating Vitamin Intakes in Young Japanese Women." J Nutr Sci Vitaminol, 2008. vol. 54, pp. 223-229.

Tolstikov, Vladimir et al., "Metabolomics Analysis of Metabolic Effects of Nicotinamide Phosphoribosyltransferase (NAMPT) Inhibition on Human Cancer Cells." PLoS ONE, 2014. vol. 9, Issue 12, pp. 2-24.

Gruner, Nico et al., "Dried Blood Spots—Preparing and Processing for Use in Immunoassays and Molecular Techniques." J. Vis. Exp., 2015. Issue 97, pp. 1-9.

Spooner, Neil et al., "A device for dried blood microsampling in quantitative bioanalysis: overcoming the issues associated with blood hematocrit" Bioanalysis, 2015. vol. 7, pp. 653-659.

Jannetto, Paul J. et al., "Immunosuppresant Monitoring by LC-MS/MS Using Mitra (tm) Microsampling Devices." Mayo Clinic, 2015.

Kovac, Jana et al., "Evaluation of a novel micro-sampling device, Mitra (tm), in comparison to dried blood spots, for analysis of praziquantel in Schistosoma haematobium-infected children in rural Cote d'Ivoire." Journal of Pharmaceutical and Biomedical Analysis, 2018. vol. 151, pp. 339-346. Elsevier.

Xie, Iris et al., "Extractability-mediated stability bias and hematocrit impact: High extraction recovery is critical to feasibility of volumetric adsorptive microsampling (VAMS) in regulated bioanalysis." Journal of Pharmaceutical and Biomedical Analysis, 2018. vol. 156, pp. 58-66. Elsevier.

Tanna, Sangeeta et al., "Volumetric absorptive microsampling (VAMS) coupled with high-resolution, accurate-mass (HRAM) mass spectrometry as a simplified alternative to dried blood spots (DBS) analysis for therapeutic drug monitoring of cardiovascular drugs." Clinical Mass Spectrometry, 2018. vol. 10, pp. 1-8. Elsevier.

Kok, Miranda G.M. et al., "Volumetric absorptive microsampling: Current advances and applications." Journal of Pharmaceutical and Biomedical Analysis, 2018. vol. 147, pp. 288-296. Elsevier.

Velghe, Sofie et al., "Volumetric absorptive microsampling as an alternative tool for therapeutic drug monitoring of first-generation anti-epileptic drugs." Analytical and Bioanalytical Chemistry, 2018. vol. 418, pp. 2331-2341.

Verheijen, R.B. et al., "Validation and clinical application of an LC-MS/MS method for the quantification of everolimus using volumetric absorptive microsampling." Journal of Chromatography B, 2019. vol. 1104, pp. 234-239. Esevier.

Tanna, Sangeeta et al., "LC-HRMS analysis of 216 patient microvolume blood samples to allow clinical assessment of medication adherence" De Montfort University—Leicester School of Pharmacy, 2017.

Rowland, Malcolm et al., "Use of Dried Blood Spots in Drug Development: Pharmacokinetic Considerations." The AAPS Journal, 2010. vol. 12, No. 3, pp. 290-293.

Neoteryx, "bioanalytical method for microsamples examined " small molecules—antiepileptic drugs. 2018.

Kansal, Monika et al., "Guidelines for the Efficient Extraction and Analysis of Pain Panel from Dried Blood Using the Mitra (tm) Microsampling Device." NEOTERYX, 2016.

Wilhelm, Abraham J. et al., "Therapeutic Drug Monitoring by Dried Blood Spot: Progress to Date and Future Directions." Clin Pharmacokinet, 2014. vol. 53, pp. 961-973.

Mercolini, Laura et al., "Therapeutic Drug Monitoring (TDM) by Means of Novel Sampling and Extraction Procedures: A Comparative Study." Laboratory of Pharmaco-Toxicological Analysis. EBF 8th Open Symposium.

Friedl, Bettina, et al. "A method for the minimally invasive drug monitoring of mitotane by means of volumetric absorptive microsampling for a home-based therapeutic drug monitoring". Analytical and Bioanalytical Chemistry, 2019, https://doi.or/10.1007/s00216-019-01868-1. Springer-Verlag GmbH Germany, part of Springer Nature (2019).

Koster, Remco A., et al. "A volumetric absorptive microsampling LC-MS/MS method for five immunosuppressants and their hematocrit effects". Bioanalysis, 2019, (epub ahead of print) (10.4155/bio-2018-0312). Newlands Press (2019).

Brady, Kelley, et al. "Transition of Methotrexate Polyglutamate Drug Monitoring Assay from Venipuncture to Capillary Blood-Based Collection Method in Rheumatic Diseases". JALM, 2019, 04:01, 000. American Association for Clinical Chemistry (2019).

Velghe, Sofie, et al. "Is the hematocrit still an issue in quantitative dried blood spot analysis?" Journal of Pharmaceutical and Biomedical Analysis, 2019, 163, 188-196. Elsevier (2018).

\* cited by examiner

METHOD FOR PREPARATION OF DRIED BLOOD SAMPLE FOR MULTIPLEXING OF ANALYTES

RELATED APPLICATION

The present application is a continuation application and claims the benefit under 35 U.S.C. 120 on co-pending U.S. patent application Ser. No. 16/281,932, filed on Feb. 21, 2019 and entitled "METHOD FOR QUALITATIVE AND QUANTITATIVE MULTIPLEXING OF DRUG ANALYTES FROM BIOLOGICAL SAMPLES", which claims priority on U.S. Provisional Patent Application Ser. No. 62/639,713, filed on Mar. 7, 2018, and entitled "MULTIPLEXING METHOD FOR DRIED BLOOD ANALYSIS USING A NON-CARD MICRO SAMPLING DEVICE TO PERFORM QUANTITIVE/QUALITATIVE DRUG ANALYSIS, GENETIC ANALYSIS, AND IMMUNOASSAY ANALYSIS". To the extent permitted, the contents of U.S. patent application Ser. No. 16/281,932 and U.S. Provisional Patent Application Ser. No. 62/639,713 are incorporated herein by reference.

BACKGROUND

Liquid chromatography-mass spectrometry (LC-MS) and liquid chromatography tandem mass spectrometry (LC-MS/MS) are analytical chemistry techniques that combine the physical separation capabilities of high performance liquid chromatography (or HPLC) with the mass analysis capabilities of mass spectrometry (MS). These systems are popular in chemical analysis because the individual capabilities of each technique are enhanced synergistically. While liquid chromatography separates mixtures with multiple components, mass spectrometry provides structural identity of the individual components with high molecular specificity and detection sensitivity.

In recent years, liquid chromatography tandem mass spectrometry (LC-MS/MS) has emerged as an innovative analytical technology applicable to some analyses in the endocrinology laboratory. In tandem MS (MS/MS) two quadrupole mass filters are combined and target analyte molecules from the first quadrupole are submitted to a controlled fragmentation in a collision cell. The entirety of ions is transferred into the first quadrupole mass filter. Here, the mass-to-charge ratio (m/z) of the intact ionized target analyte is selected, and all other ion species are filtered out. The selected ions sharing identical m/z are continuously transferred into the collision cell. Ions selected by the first quadrupole fragment into characteristic product ions. For various analytes, several characteristic, thermodynamically favored product ions are generated. These fragment ions are guided to the second quadrupole. The radiofrequency settings of the second analytical quadrupole are adjusted in a way that only one selected fragment ion will pass, while all other fragment ion species are filtered out. Thus, one defined "daughter ion" from one defined "parent ion" finally reaches an ion detector, and can then be identified and/or quantified.

Many medical procedures require tests to be performed with a sample of a patient's fluid. The ability to rapidly and accurately detect a wide range of analytes present in a bodily fluid is often critical for diagnosis, prognosis, and treatment of diseases, or for determining specific drugs that may be present in a patient's system.

Traditionally, detecting a range of analytes present in a bodily fluid such as blood has been performed in laboratories by trained technicians who take blood via venipuncture or using smaller blood samples such as by a finger stick. Performing such assays using LC-MS or LC-MS/MS can be time-consuming and costly. Running dozens or even hundreds of such tests to determine the presence (or absence) and/or quantity of various analytes characteristically requires a relatively large volume of blood. With conventional techniques, it is difficult to simultaneously test for a relatively large number of analytes. Consequently, each test requires a certain quantity of blood. The greater number of tests that are required, the greater the volume of blood that is needed from the patient.

Although several point of care testing devices are available, the majority of are adapted to detect a single analyte, or one type of analytes for a single indication. Examples of such point of care devices are tests for glucose, serum cholesterol, pregnancy, ovulation, etc.

Thus, there remains a need for alternative testing methods that are capable of detecting a wider range and/or greater number of analytes from biological samples such as dried blood, urine and/or other biological samples. A desirable system would allow quantitative and qualitative measurements of analytes in a more cost effective and timely manner.

SUMMARY

The present invention is directed toward a method for preparation of a dried blood sample for multiplexing of analytes. In one embodiment, the method includes the steps of mixing an Internal Standard solution with a first diluent in a vessel, the Internal Standard solution including a plurality of different Internal Standards, adding the dried blood sample to the vessel, sonicating the vessel containing the Internal Standard solution, the first diluent and the dried blood sample, and removing the dried blood sample from the vessel.

In some embodiments, the Internal Standard solution includes a plurality of Internal Standards.

In certain embodiments, the Internal Standard solution includes at least 15 Internal Standards.

In various embodiments, the dried blood sample is generated using less than 50 μL of blood.

In some embodiments, the dried blood sample is generated using less than 10 μL of blood.

In certain embodiments, the first diluent is methanol.

In various embodiments, the first diluent includes water and methanol.

In some embodiments, a ratio of the volume of the water to the volume of the methanol is less than 1:1.

In certain embodiments, the method further includes the step of adding a second diluent to the dried blood sample.

In various embodiments, the second diluent is water.

In some embodiments, the volume of the second diluent is substantially similar to the volume of the first diluent.

In certain embodiments, one of the diluents at least partially promotes protein precipitation.

In various embodiments, one of the diluents includes a compound that is selected from the group consisting of acetonitrile, ethanol, acetate, formic acid, water and methanol.

In some embodiments, the method further includes the step of analyzing at least a portion of the contents of the sonicated vessel to determine the presence or absence of hydroxychloroquine.

In certain embodiments, the method further includes the step of analyzing at least a portion of the contents of the sonicated vessel to determine the presence or absence of at least 15 different analytes.

In various embodiments, the method further includes the step of analyzing at least a portion of the contents of the sonicated vessel using one of LC-MS and LC-MS/MS in a positive ionization mode.

In some embodiments, the method further includes the step of analyzing at least a portion of the contents of the sonicated vessel using one of LC-MS and LC-MS/MS in a negative ionization mode.

In certain embodiments, the method further includes the step of analyzing at least a portion of the contents of the sonicated vessel to determine the presence or absence of a plurality of analytes, wherein a ratio of the number of analytes for which the presence or absence is being determined to the number of Internal Standards in the Internal Standard solution is at least approximately 2:1.

In various embodiments, the method further comprises the step of analyzing at least a portion of the contents of the sonicated vessel to determine the presence or absence of a plurality of analytes, wherein a ratio of the number of analytes for which the presence or absence is being determined to the volume (in µL) of blood from which the dried blood sample was obtained is at least approximately 4:5.

In some embodiments, the volume of the Internal Standard solution can be less than approximately 10% of the volume of the first diluent.

In certain embodiments, the volume of the Internal Standard solution can be greater than approximately 10% of the volume of the first diluent.

BRIEF DESCRIPTION OF THE DRAWINGS

The novel features of this invention, as well as the invention itself, both as to its structure and its operation, will be best understood from the accompanying figures, taken in conjunction with the accompanying description, in which similar reference characters refer to similar parts, and in which.

DESCRIPTION

Embodiments of the present invention are described herein in the context of a method for qualitative and quantitative multiplexing of drug analytes from biological samples such as dried blood, urine and/or other suitable biological samples. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Further, it is understood that although the description herein regarding biological samples is somewhat directed toward analysis of dried blood samples and urine samples, such is provided for the sake of clarity and simplicity. It is recognized that other suitable biological samples can equally and effectively be analyzed utilizing one or more of the methods disclosed herein. The types of dried blood samples can vary, and can include, without limitation, samples obtained via Neoteryx® blood collection devices, as one non-exclusive example. As used herein, the dried blood samples are generated from relatively small volumes of blood. For example, in one embodiment, the dried blood sample is contemplated to be obtained from less than approximately 50 µL of blood from a patient. In certain non-exclusive, alternative embodiments, the dried blood sample can be obtained from less than approximately 30 µL, 20 µL or 10 µL of blood from the patient.

For at least some of the embodiments shown and described herein, the specific drug analytes can include one or more of the following 303 analytes: 10,11-Dihydro-10-OH-Carbamazepine, 11-nor-9-carboxy-delta9-THC, 5-Fluoro NPB-22, 5-MeO-DMT, 6-Hydroxy Buspirone, 6-monoacetylmorphine, 7-Aminoclonazepam, 7-HydroxyMitragynine, 9-Hydroxyrisperidone, AB-FUBINACA, Acebutolol, Acetaminophen, Acetazolamide, Acetyl-Fentanyl, Alfuzosin, Alpha-hydroxyalprazolam, Alpha-hydroxymidazolam, Alpha-hydroxytriazolam, Alpha-hydroxy-Metoprolol, Alpha-PVP, Alprazolam, AM2201, Amiodarone, Amitriptyline, Amlodipine, Amobarbital, Amoxapine, Amphetamine, Apixaban, Aripiprazole (Abilify), Asenapine, Atenolol, Atomoxetine, Atorvastatin, Atorvastatin Lactone, Baclofen, Benazeprilat, Benzolyecognine, Biotin, Bisoprolol, Brexpiprazole, Budesonide, Buprenorphine, Bupropion (Wellbutrin), Buspirone, Butabarbital, Butalbital, Butorphanol, Caffeine, Candesartan, Candesartan Cilexetil, Canrenone, Carbamazepine, Carfentanil, Carisoprodol, Carvedilol, Celecoxib, Cetirizine, Chlordiazepoxide, Chlorothiazide, Chlorpheniramine, Chlorpromazine, Cilostazol, Citalopram, Clobazam, Clomipramine, Clonazepam, Clopidogrel, Clozapine, Clozapine N-oxide, Cocaine, Codeine, Colchicine, Cotinine, Cyclobenzaprine, Dabigatran, Darifenacin, Dehydro Aripiprazole, Desalkylflurazepam, Desipramine, Desloratadine, Desmethoxyangonin, Dexamethasone, Dextromethorphan, Diazepam, Diclofenac, Dihydrocodeine, Dihydrokavain, Dihydromethysticin, Diltiazem, Diphenhydramine, Dipyridamole, DMT, Donepezil, Doxazosin, Doxepin, Dronedarone, Duloxetine, EDDP, Eletriptan, Enalaprilat, Ephedrine, Estazolam, Eszopiclone, Ethyl Sulfate (EtS), Ethyl-beta-D-glucuronide (EtG), Etodolac, Ezetimibe, Famotidine, FDU-PB-22, Febuxostat, Fenofibric Acid, Fentanyl, Fexofenadine, Finasteride, Flecainid, Flunitrazepam, Fluoxetine, Fluphenazine, Flurazepam, Fluvoxamine, Furosemide, Gabapentin, Gemfibrozil, Glimepiride, Glipizide, Glyburide, Guanfacine, Haloperidol, HU-210, Hydrochlorothiazide, Hydrocodone, Hydromorphone, Hydroxybupropion, Hydroxychloroquine, Hydroxyzine, Hyoscyamine, Ibuprofen, Iloperidone, Imipramine, Indapamide, Indomethacin, Irbesartan, Itraconazole, JWH-018-5OH-Pentyl Metabolite, JWH-018-5-Pentanoic Acid Metabolite, JWH-019, JWH-073-4OH-butyl-Metabolite, JWH-081, JWH-122, JWH-250-5OH-Pentyl Metabolite, Kavain, Ketamine, Labetalol, Lamotrigine, Lansoprazole, Levetiracetam, Levorphanol, Levothryoxine, Licarbazepine, Linagliptin, Lisdexamfetamine, Lisinopril, Loratadine, Lorazepam, Losartan, Lurasidone, Marinol, MDA, MDEA, MDMA, MDPV, Meloxicam, Meperidine, Mephedrone, Meprobamate, Metaxalone, Metformin, Methadone, Methamphetamine, Methocarbamol, Methotrexate, Methylone, Methylphenidate, Methysticin, Metoclopramide, Metoprolol, Midazolam, Milnacipran, Mirtazapine, Mitragynine, MMB-CHMICA, Montelukast, Morphine, Nadolol, Naloxone, Naltrexone, Naproxen, Nateglinide, N-Desethylamiodarone, N-Desmethylclomipramine, N-Desmethylflunitrazepam, N-DesmethylTramadol, N-Desmethyl-U-47700, Nifedipine, Nitrofurantoin, Norbuprenorphine, Norchlordiazepoxide, Nordiazepam, Norcodeine, Nordoxepin, Norfentanyl, Norfluoxetine, Norhydrocodone, Norketamine, Normephedrone, Normirtazapine, Noroxycodone, Norpropoxyphene, Norquetiapine, Nortriptyline, Nor-U-47700 (Didesmethyl-U-47700), O-DesmethylTramadol, O-DesmethylVenlafaxine, Olanzapine, Olmesartan Acid, Olopatadine, Omeprazole, Omeprazole (Carboxylic Acid Metabolite), Ondansetron, Oxazepam, Oxcarbazepine, Oxipurinol, Oxycodone, Oxymorphone, Pantoprazole, Paroxetine, PCP, Pentobarbital, Pentoxifylline, Perphenazine, Phenobarbital, Phentermine, Phenytoin, Pioglitazone, Piroxicam, Prazepam, Prednisolone, Pregabalin, Primidone, Promethazine, Propoxyphene, Propranolol, Pseudoephedrine, Quetiapine (Seroquel), Raloxifene, Ranitidine, Ranolazine, Repaglinide, Risperidone, Ritalinic Acid, Rivaroxaban, Rivastigmine, Ropinirole, Rosiglitazone, Saxagliptin, Secobarbital, Sertraline (Zoloft), Sildenafil, Simvastatin, Sitagliptin, Solifenacin, Sumatriptan, Tadalafil, Tapentadol, Telmisartan, Temazepam, Terazosin, Thioridazine, Thiothixene, Tiagabine, Ticagrelor, Tofacitinib, Topiramate, Torsemide, Tramadol, Trazodone, Triamterene, Triazolam, Valproic Acid, Valsartan, Vardenafil, Venlafaxine, Verapamil, Vilazodone, Vortioxetine, Warfarin, Yangonin, Zaleplon, Ziprasidone, Zolpidem, Zonisamide and Zopiclone N-Oxide.

Figure 1:
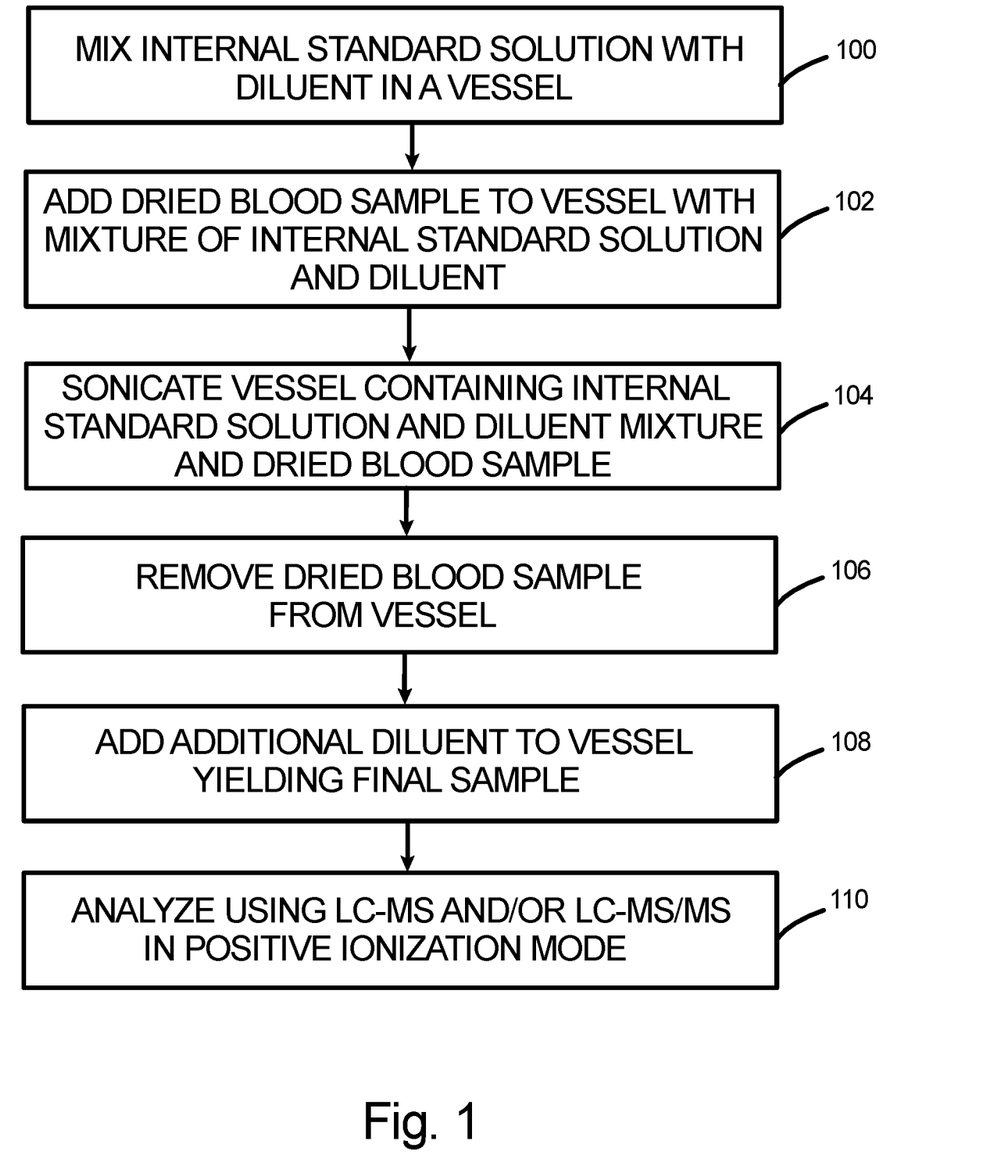
FIG. 1 is a flow chart showing one embodiment of a method for qualitative and quantitative multiplexing of drug analytes from a dried blood sample using a positive ionization mode during mass spectrometry.

FIG. 1 is a flow chart showing one embodiment of a method for qualitative and quantitative multiplexing of drug analytes from biological samples. More specifically, FIG. 1 shows one embodiment of a method for qualitative and quantitative multiplexing of drug analytes from a dried blood sample.

The dried blood sample (or other biological samples) can come from patients under the care of a treating physician from clinics and clinical institutions or from private parties. The methods described herein include novel robust, highly specific and reliable, e.g. free of interference, chromatographic separation methods. It is recognized that in certain embodiments, various steps illustrated and described with respect to FIG. 1 can be omitted without deviating from the scope of the disclosure herein. It is further recognized that in some embodiments, additional steps can be included in the method shown in FIG. 1 that are not illustrated and described. Additionally, it is understood that although dried blood is the biological sample that is specifically described relative to the description of FIG. 1, any other suitable biological sample could equally be utilized. Thus, as used herein, "dried blood sample" is but one example of the "biological sample". In certain non-exclusive embodiments, the method for qualitative and quantitative multiplexing of drug analytes from a dried blood sample can include one or more of the following steps.

In the embodiment illustrated in FIG. 1, at step 100, an Internal Standard solution and a diluent (also sometimes referred to herein as the "first diluent") are added to one another in a vessel, such as a 1.2 mL test tube as one representative, non-exclusive example. In one embodiment, a plurality of vessels, i.e. test tubes, can be positioned into a multi-well plate, such as a 96-well plate that can receive 96 test tubes, in one representative example. In this embodiment, the first diluent can be methanol. In non-exclusive alternative embodiments, the first diluent can be acetonitrile, ethanol, acetate, formic acid, or any other suitable diluent that at least partially promotes protein precipitation.

The concentration of the Internal Standard solution can be varied. In various embodiments, the Internal Standard solution can include a plurality of Internal Standards mixed together with a solution that includes methanol and water. In various embodiments, the Internal Standards that are included in the Internal Standard solution can include one or more that are selected from the group consisting of the following 98 Internal Standards: 6-Acetyl-morphine-d6, Acetaminophen-d4, Alprazolam-d5, Amphetamine-d11, Benzoylecgonine-d3, Buprenorphine-d4, Carisoprodol-d7, Cocaine-d3, Codeine-d3, Duloxetine-d3, Diazepam-d5, EDDP-d3, Hydrocodone-d3, Hydromorphone-d3, Imipramine-d3, Levorphanol-d3, Lorazepam-d4, MDA-d5, MDEA-d5, MDMA-d5, Meperidine-d4, Methadone-d3, Methamphetamine-d5, Morphine-d6, Norbuprenorphine-d3, Nordiazepam-d5, Norfentanyl-d5, Noroxycodone-d3, Norpropoxyphene-d5, Oxazepam-d5, Oxycodone d3 (O-methyl-d3), Oxymorphone-d3, PCP-d5, Propoxyphene-D11, Trazadone-d6, Temazepam-d5, Zolpidem-d7,11-nor-9 carboxy Delta 9-THC-d3, JWH-018 4-Hydroxypentyl-d5, Naloxone-d5, Caffeine-13C3, Lamotrigine-13C,15N4, Levetiracetam-d6, Zonisamide-13C6, Clozapine-d4, Tiagabine-d6, Oxcarbazepine-13C6, Mephedrone-d3, Methylphenidate-d9, Tramadol-13C-d3, Venlafaxine-d6, Ritalinic Acid-d10, O-Desmethylvenlafaxine-d6, Cotinine-d3,7-HydroxyMitragynine-d3, Alpha-PVP-d8, Chlordiazepoxide-d5, Clobazam-13C6, Clomipramine-d3, Desalkylflurazepam-d4, Dextromethorphan-d3, Ephedrine-d3, Estazolam-d5, Flunitrazepam-d7, Haloperidol-d4, Ketamine-d4, Lisdexamphetamine-d4, Delta9-THC-d3 (Marinol), MDPV-d8, Methylone-d3, Midazolam-d4, Mitragynine-d3, Naltrexone-d3, Nortriptyline-d3, Phentermine-d5, Prazepam-d5, Risperidone-d4, Triazolam-d4, Zaleplon-d4, Amobarbital-D5, Phenobarbital-D5, Pentobarbital-D5, Butalbital-D5, Butabarbital-D5, Secobarbital-D5, Ethyl-D5 Sulfate, Ethyl Beta D-Glucuronide-D5, (−)-Cotinine-D3, Candesartan-D5, Dexamethasone-D4, JWH-018-N(4OH-Pentyl) D5, Lisdexamfetamine-D4, Naltrexone-D3, Norcodeine-D3, Rivaroxaban-D4, Rosiglitazone-D3, Sildenafil-D3 and Telmisartan-D3. It is understood that the foregoing Internal Standards are not intended to be an all-inclusive listing of all possible Internal Standards that can be used with the methods provided herein. Rather, the foregoing Internal Standards are merely a representative listing of various Internal Standards that can be used.

In one embodiment, the Internal Standard solution can have an Internal Standard concentration of approximately 1000 ng/mL. Alternatively, the final product of the Internal Standard solution can have an Internal Standard concentration that is greater or less than 1000 ng/mL. For example, in non-exclusive alternative embodiments, the final product of the Internal Standard solution can have an Internal Standard concentration that is between 100 ng/mL and 10,000 ng/mL. In one embodiment, the water that is used can be HPLC-grade water. Additionally, or in the alternative, the methanol that is used can be HPLC-grade methanol. The ratio of the volume of water to the volume of methanol in the Internal Standard solution can vary. In one embodiment, the ratio of the volume of water to the volume of methanol in the Internal Standard solution can be approximately 1:1. However, in alternative embodiments, the ratio of the volume of water to the volume of methanol in the Internal Standard solution can be greater than approximately 5:1, 4:1, 3:1, 2:1 or 1:1. In other alternative embodiments, the ratio of the volume of water to the volume of methanol in the Internal Standard solution can be less than approximately 1:5, 1:4, 1:3, 1:2 or 1:1. Still alternatively, the plurality of Internal Standards can be mixed with a solution or a compound other than a mixture of water and methanol.

The number of Internal Standards included in the Internal Standard solution can vary depending upon the number and type of analytes being tested in the dried blood sample. For example, in certain tests that include at least 50 analytes being tested simultaneously, a ratio of the number of analytes being tested to the number of Internal Standards in the Internal Standard solution can be less than 2:1. In non-exclusive alternative embodiments, the ratio of the number of analytes being tested to the number of Internal Standards in the Internal Standard solution can be approximately 2:1, or the ratio can be greater than 2:1, greater than 3:1, greater than 5:1, greater than 8:1 or greater than 10:1. In still other embodiments, the ratio of the number of analytes being tested to the number of Internal Standards in the Internal Standard solution can be approximately 90:53, 20:9, 137:16, or any other suitable ratio. In yet other embodiments that include fewer than 50 analytes being tested simultaneously, the ratio of the number of analytes being tested to the number of Internal Standards in the Internal Standard solution can be similar to the aforementioned ratios. Still alternatively, the number of Internal Standards that are used in the Internal Standard solution can range from 1-98. In an alternative embodiment, greater than 98 Internal Standards can be used.

Further, the relative volumes of the Internal Standard solution and the diluent can be varied. In one embodiment, the volume of the Internal Standard solution can be approximately 10% of the volume of diluent that is used. For example, in one non-exclusive embodiment, 20 µL of the Internal Standard solution can be added together with 200 µL of the diluent to make a total of 220 µL in the vessel. However, it is recognized that the total volume can be varied as necessary, provided the ratio of the volume of the Internal Standard solution to the volume of diluent is the same. However, in alternative embodiments, the volume of the Internal Standard solution can be greater or less than 10% of the volume of diluent that is used. In certain embodiments, the diluent can be HPLC-grade methanol.

At step 102, the dried blood sample is added to the combination of the Internal Standard solution and the diluent. The form of the dried blood sample can vary. In one non-exclusive embodiment, the dried blood sample can include a Mitra® clamshell blood-absorbing tip manufactured by Neoteryx® that has absorbed a relatively small volume of blood from a patient. For instance, in certain embodiments, the blood-absorbing tip can hold approximately 10-50 µL of blood. It is recognized, however, that any suitable means of obtaining and/or storing a blood sample from a patient can be used. In the embodiment that utilizes a Mitra® clamshell blood-absorbing tip, the blood-infused tip is immersed in the vessel with the combination of the Internal Standard solution and the diluent. The amount of blood that is used to generate the dried blood sample can vary. In one embodiment, the dried blood sample can be generated from an initial amount of blood that is approximately 20 µL. Alternatively, the dried blood sample can be generated from an initial amount of blood that is approximately 10 µL, 30 µL or 50 µL. Still alternatively, the dried blood sample can be generated from an initial amount of blood that is less than 10 µL or greater than 50 µL.

At step 104, the vessel that contains the dried blood sample and the combination of the Internal Standard solution and the diluent is sonicated. One or more vessels (such as a plurality of vessels positioned in a multi-well plate, in one embodiment) each containing a dried blood sample and a combination of the Internal Standard solution and the diluent, can be sonicated simultaneously. Deionized water can be set to approximately 4 degrees Celsius (or higher or lower, as needed), and would be at a sufficient level so that the deionized water is higher than the tip containing the dried blood sample. In one embodiment, sonication can proceed for a total of 2-5 minutes, and can cycle on for 20 seconds and off for 10 seconds. Alternatively, the sonication process can have a duration of less than 2 minutes or greater than 5 minutes. Still alternatively, the on cycle can have a duration of greater or less than 20 seconds, and/or the off cycle can have a duration of greater or less than 10 seconds. During the sonication process, the amplitude setting can be between 70-100%. In one embodiment, the amplitude setting can be approximately 75%.

At step 106, the dried blood tips (or other blood-absorbing material) is removed from the vessel and can be discarded.

At step 108, an additional diluent (also sometimes referred to herein as the "second diluent") is added to each of the vessels that were sonicated at step 104 to yield a final sample. In one embodiment, the second diluent can be HPLC-grade water. Alternatively, the second diluent can include other compounds or solutions. Further, the second diluent for each vessel can have a volume that is substantially similar or identical to the volume of the first diluent added to each vessel and combined with the Internal Standard solution at step 100. For example, if 200 µL of the first diluent was added to the Internal Standard solution at step 100, an additional 200 µL of the second diluent can be added to the vessel at step 108. Alternatively, a volume of the second diluent that is greater or less than 200 µL can be added during step 108. In this representative example, a total of approximately 420 µL of the final sample would be present in each vessel. It is understood that these amounts are provided herein as one representative example, and are not intended to be limiting in any manner.

At step 110, a portion or all of the final sample in step 108 from a particular vessel can then be analyzed by LC-MS and/or LC-MS/MS to simultaneously determining the presence or absence and quantity of a plurality of analytes in the dried blood sample. It is understood that during a single LC-MS and/or LC-MS/MS analysis, various analytes can be detected at slightly different times. However, as used herein, the term "simultaneously" is intended to mean during a single LC-MS and/or LC-MS/MS analysis. In various embodiments, the positive ionization mode of the LC-MS and/or LC-MS/MS process can simultaneously determine the presence or absence of at least 30 analytes in the dried blood sample. In various non-exclusive alternative embodiments, utilizing the method(s) outlined herein, the positive ionization mode of the LC-MS and/or LC-MS/MS process can simultaneously determine the presence or absence of at least 40, 50, 60, 70, 80, 90, 100, 110, 120, 130, 140, 150, 200, 250 or 300 analytes in the dried blood sample. Using the methodology provided herein, a ratio of the number of analytes for which the presence or absence is being determined to the volume (in μL) of blood from which the dried blood sample was obtained can be at least approximately 1:1. In non-exclusive alternative embodiments, the ratio of the number of analytes for which the presence or absence is being determined to the volume (in μL) of blood from which the dried blood sample was obtained can be at least approximately 2:1, 3:1, 9:2, 5:1, 6:1, 8:1 or 10:1.

In certain embodiments, the LC-MS and/or LC-MS/MS process can yield evidence of the presence or absence of any single analyte, any combination of analytes, or all of the analytes listed and/or described herein during a single LC-MS and/or LC-MS/MS analysis. The analytes present in the final sample can be determined by any suitable method, including, but not limited to, consulting a lookup table, printouts from the LC-MS and/or LC-MS/MS process, appropriate software, etc.

The volume of the final sample that is needed for LC-MS and/or LC-MS/MS can vary. In various embodiments, the volume of the final sample that is needed is dependent upon the number of analytes being detected and/or analyzed during the LC-MS and/or LC-MS/MS process. For example, in one embodiment, a ratio of the number of analytes to the volume of a portion of the final sample (in μL) that is used during a single LC-MS and/or LC-MS/MS analysis is at least approximately 3:2. In non-exclusive, alternative embodiments, the ratio of the number of analytes to the volume of the portion of the final sample (in μL) that is used during a single LC-MS and/or LC-MS/MS analysis can be at least approximately 2:1, 5:1, 10:1, 15:1 or 20:1. Thus, a relatively large number of analytes can be analyzed during the LC-MS and/or LC-MS/MS process using a relatively small volume of the final sample from step 108. In this manner, numerous retests or reruns of step 110 can occur, if necessary.

Figure 2:
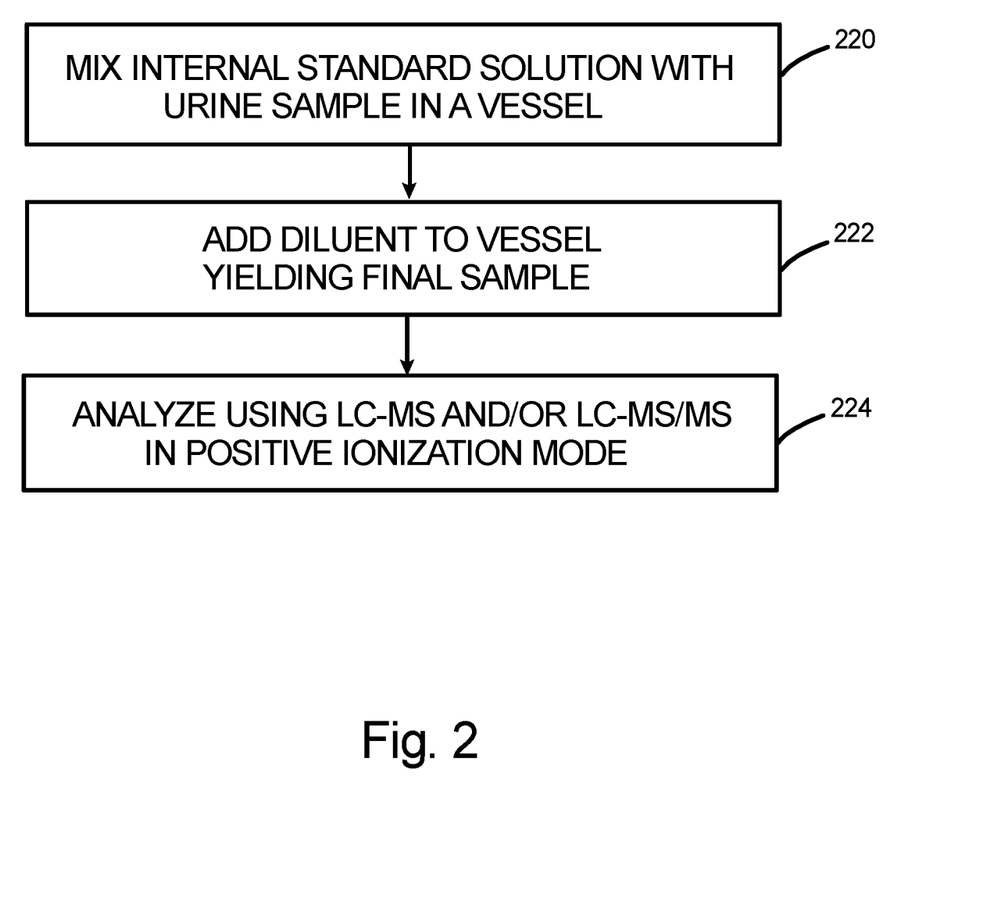
FIG. 2 is a flow chart showing one embodiment of a method for qualitative and quantitative multiplexing of drug analytes from a urine sample using a positive ionization mode during mass spectrometry.

FIG. 2 is a flow chart showing one embodiment of a method for qualitative and quantitative multiplexing of drug analytes from a urine sample. It is recognized that in certain embodiments, various steps illustrated and described with respect to FIG. 2 can be omitted without deviating from the scope of the disclosure herein. It is further recognized that in some embodiments, additional steps can be included in the method shown in FIG. 2 that are not illustrated and described. In certain non-exclusive embodiments, the method for qualitative and quantitative multiplexing of drug analytes from a urine sample can include one or more of the following steps.

At step 220, an Internal Standard solution and a urine sample are added to one another in a vessel, such as a 1.2 mL test tube as one representative, non-exclusive example. The preparation of the Internal Standard solution can be substantially similar or identical to preparation of the Internal Standard solution previously described relative to step 100 in FIG. 1.

The number of Internal Standards included in the Internal Standard solution can vary depending upon the number and type of analytes being tested in the urine sample. For example, in certain tests that include at least 50 analytes being tested simultaneously, a ratio of the number of analytes being tested to the number of Internal Standards in the Internal Standard solution can be less than 2:1. In non-exclusive alternative embodiments, the ratio of the number of analytes being tested to the number of Internal Standards in the Internal Standard solution can be approximately 2:1, or the ratio can be greater than 2:1, greater than 3:1, greater than 5:1, greater than 8:1 or greater than 10:1. In still other embodiments, the ratio of the number of analytes being tested to the number of Internal Standards in the Internal Standard solution can be approximately 90:53, 20:9, 137:16, or any other suitable ratio. In yet other embodiments, that include fewer than 50 analytes being tested simultaneously, the ratio of the number of analytes being tested to the number of Internal Standards in the Internal Standard solution can similar to the aforementioned ratios.

The ratio of the volume of the Internal Standard solution and the urine sample can vary. In one embodiment, the ratio of the volume of the Internal Standard solution and the urine sample can be approximately 1:1. However, in non-exclusive alternative embodiments, the ratio of the volume of the Internal Standard solution and the urine sample can be greater than approximately 1:1, 2:1, 3:1, 4:1 or 5:1. Still alternatively, the ratio of the volume of the Internal Standard solution and the urine sample can be less than approximately 1:1, 1:2, 1:3, 1:4 or 1:5.

At step 222, a diluent is added to the mixture of the Internal Standard solution and the urine sample from step 220 to form a final sample. In various embodiments, the diluent can be a solution that includes water and methanol. In one embodiment, the water that is used can be HPLC-grade water. Additionally, or in the alternative, the methanol that is used can be HPLC-grade methanol. The ratio of the volume of water to the volume of methanol in the diluent can vary. In one embodiment, the ratio of the volume of water to the volume of methanol in the diluent can be approximately 1:1. However, in alternative embodiments, the ratio of the volume of water to the volume of methanol in the diluent can be greater than approximately 5:1, 4:1, 3:1, 2:1 or 1:1. In other alternative embodiments, the ratio of the volume of water to the volume of methanol in the diluent can be less than approximately 1:5, 1:4, 1:3, 12 or 1:1. Still alternatively, the diluent can comprise compounds other than a mixture of water and methanol.

Further, the relative volumes of the mixture of the Internal Standard solution and the urine sample on the one hand, and the diluent on the other hand, can be varied. In one embodiment, the volume of the mixture of the Internal Standard solution and the urine sample can be approximately 25% of the volume of diluent that is added. For example, in one non-exclusive embodiment, 20 μL of the Internal Standard solution can be added together with 20 μL of the urine sample and 160 μL of the diluent to make a total of 200 μL in each vessel. However, it is recognized that the total volume can be varied as necessary. However, in alternative embodiments, the volume of the mixture of the Internal Standard solution and the urine sample can be greater or less than approximately 25% of the volume of diluent that is added.

At step 224, a portion or all of the final sample from step 222 from a particular vessel can then be analyzed by LC-MS and/or LC-MS/MS to determine the presence, absence and/or quantity of a plurality of analytes in the urine sample. In various embodiments, the positive ionization mode of the LC-MS and/or LC-MS/MS process can simultaneously determine the presence or absence of at least 30 analytes in the urine sample. In various non-exclusive alternative embodiments, utilizing the method(s) outlined herein, the positive ionization mode of the LC-MS and/or LC-MS/MS process can simultaneously determine the presence or absence of at least 40, 50, 60, 70, 80, 90, 100, 110, 120, 130, 140, 150, 200, 250 or 300 analytes in the urine sample. In certain embodiments, the LC-MS and/or LC-MS/MS process can yield evidence of the presence or absence of any single analyte, any combination of analytes, or all of the analytes listed and/or described herein during a single LC-MS and/or LC-MS/MS analysis. The analytes present in the final sample can be determined by any suitable method, including, but not limited to, consulting a lookup table, printouts from the LC-MS and/or LC-MS/MS process, appropriate software, etc.

The volume of the final sample that is needed for LC-MS and/or LC-MS/MS can vary. In various embodiments, the volume of the final sample that is needed is dependent upon the number of analytes being detected and/or analyzed during the LC-MS and/or LC-MS/MS process. For example, in one embodiment, a ratio of the number of analytes to the volume of a portion of the final sample (in µL) that is used during a single LC-MS and/or LC-MS/MS analysis is at least approximately 2:1. In non-exclusive, alternative embodiments, the ratio of the number of analytes to the volume of the portion of the final sample (in µL) that is used during a single LC-MS and/or LC-MS/MS analysis can be at least approximately 5:1, 10:1, 15:1, 20:1, 25:1 or 30:1. Thus, a relatively large number of analytes can be analyzed during the LC-MS and/or LC-MS/MS process using a relatively small volume of the final sample from step 222. In this manner, numerous retests or reruns of step 224 can occur, if necessary.

Figure 3:
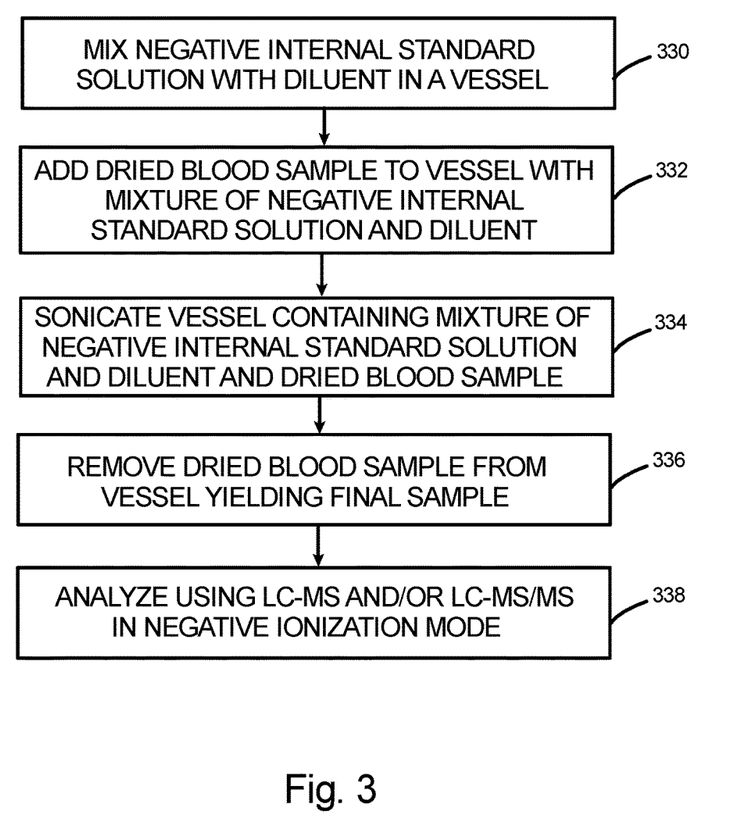
FIG. 3 is a flow chart showing another embodiment of a method for qualitative and quantitative multiplexing of drug analytes from a dried blood sample using a negative ionization mode during mass spectrometry.

FIG. 3 is a flow chart showing another embodiment of a method for qualitative and quantitative multiplexing of drug analytes from a dried blood sample using a negative ionization mode during the LC-MS and/or LC-MS/MS analysis. It is recognized that in certain embodiments, various steps illustrated and described with respect to FIG. 3 can be omitted without deviating from the scope of the disclosure herein. It is further recognized that in some embodiments, additional steps can be included in the method shown in FIG. 3 that are not illustrated and described.

At step 330, a negative Internal Standard solution (also sometimes referred to herein as "Internal Standard solution") and a diluent (also sometimes referred to herein as the "first diluent") is added to one another in a vessel, such as a 1.2 mL test tube as one representative, non-exclusive example. In this embodiment, the first diluent can include a combination of water and methanol.

In one embodiment, the specific drug analytes can include one or more of the following 16 analytes: Amobarbital, Phenobarbital, Pentobarbital, Butalbital, Butabarbital, Secobarbital, Ethyl Sulfate, Ethyl-β-D-glucuronide, Valproic Acid, Chlorothiazide, Furosemide, Hydrochlorothiazide, Lisinopril, Oxipurinol, Ezetimibe and/or Ibuprofen.

The concentration of the negative Internal Standard solution can be varied. In various embodiments, the negative Internal Standard solution can include a plurality of negative Internal Standards mixed together with a solution that includes methanol and water. In various embodiments, the negative Internal Standards that are included in the negative Internal Standard solution can include one or more that are selected from the group consisting of the following 8 Internal Standards: Amobarbital-D5, Phenobarbital-D5, Pentobarbital-D5, Butalbital-D5, Butabarbital-D5, Secobarbital-D5, Ethyl-D5 Sulfate and/or Ethyl-β-D-glucuronide D5.

In one embodiment, the negative Internal Standard solution can have a concentration of approximately 1000 ng/mL. Alternatively, the negative Internal Standard solution can have a concentration that is greater or less than 1000 ng/mL. For example, in non-exclusive alternative embodiments, the negative Internal Standard solution can have a concentration that is between 100 ng/mL and 10,000 ng/mL. In one embodiment, the water that is used in the negative Internal Standard solution can be HPLC-grade water. Additionally, or in the alternative, the methanol that is used in the negative Internal Standard solution can be HPLC-grade methanol. The ratio of the volume of water to the volume of methanol in the negative Internal Standard solution can vary. In one embodiment, the ratio of the volume of water to the volume of methanol in the negative Internal Standard solution can be approximately 1:1. However, in alternative embodiments, the ratio of the volume of water to the volume of methanol in the negative Internal Standard solution can be greater than approximately 5:1, 4:1, 3:1, 2:1 or 1:1. In other alternative embodiments, the ratio of the volume of water to the volume of methanol in the negative Internal Standard solution can be less than approximately 1:5, 1:4, 1:3, 1:2 or 1:1. Still alternatively, the plurality of negative Internal Standards can be mixed with a solution or a compound other than a mixture of water and methanol.

The number of negative Internal Standards included in the negative Internal Standard solution can vary depending upon the number and type of analytes being tested in the dried blood sample. For example, in certain tests that include at least 10 analytes being tested simultaneously, a ratio of the number of analytes being tested to the number of negative Internal Standards in the negative Internal Standard solution can be approximately 2:1. In non-exclusive alternative embodiments, the ratio of the number of analytes being tested to the number of negative Internal Standards in the negative Internal Standard solution can be approximately 2:1, or the ratio can be greater than approximately 2:1 or less than approximately 2:1.

Further, the relative volumes of the negative Internal Standard solution and the diluent can be varied. In one embodiment, the volume of the negative Internal Standard solution can be approximately 10% of the volume of the first diluent that is used. For example, in one non-exclusive embodiment, 20 µL of the negative Internal Standard solution can be added together with 200 µL of the first diluent to make a total of 220 µL in the vessel. However, it is recognized that the total volume can be varied as necessary, provided the ratio of the volume of the Internal Standard solution to the volume of the first diluent is the same. However, in alternative embodiments, the volume of the Internal Standard solution can be greater or less than 10% of the volume of the first diluent that is used.

In this embodiment, the first diluent can be HPLC-grade water mixed with HPLC-grade methanol. In one embodiment, the water-methanol mixture can be approximately 20% water and 80% methanol by volume. In non-exclusive alternative embodiments, the ratio of the volume of water to volume of methanol in the diluent can be less than approximately 20:80, or less than approximately 10:90. In still other alternative embodiments, the ratio of the volume of water to volume of methanol in the first diluent can be greater than approximately 20:80, greater than approximately 30:70, greater than approximately 40:60 or greater than approximately 50:50.

At step 332, the dried blood sample is added to the combination of the negative Internal Standard solution and the first diluent. The form of the dried blood sample can vary. In one non-exclusive embodiment, the dried blood sample can include a Mitra® clamshell blood-absorbing tip manufactured by Neoteryx® that has absorbed a relatively small volume of blood from a patient. For instance, in certain embodiments, the blood-absorbing tip can hold approximately 10-50 μL of blood. It is recognized, however, that any suitable means of obtaining and/or storing a blood sample from a patient can be used. The amount of blood that is used to generate the dried blood sample can vary. In one embodiment, the dried blood sample can be generated from an initial amount of blood that is approximately 20 μL. Alternatively, the dried blood sample can be generated from an initial amount of blood that is approximately 10 μL, 30 μL or 50 μL. Still alternatively, the dried blood sample can be generated from an initial amount of blood that is less than 10 μL or greater than 50 μL. In the embodiment that utilizes a Mitra® clamshell blood-absorbing tip, the blood-infused tip is immersed in the vessel with the combination of the negative Internal Standard solution and the first diluent.

At step 334, the vessel that contains the dried blood sample and the combination of the negative Internal Standard solution and the first diluent is sonicated. One or more vessels, each containing a dried blood sample and a combination of the negative Internal Standard solution and the first diluent, can be sonicated simultaneously. Deionized water can be set to approximately 4 degrees Celsius (or higher or lower, as needed), and would be at a sufficient level so that the deionized water is higher than the tip containing the dried blood sample. In one embodiment, sonication can proceed for a total of 2-5 minutes, and can cycle on for 20 seconds and off for 10 seconds. Alternatively, the sonication process can have a duration of less than 2 minutes or greater than 5 minutes. Still alternatively, the on cycle can have a duration of greater or less than 20 seconds, and/or the off cycle can have a duration of greater or less than 10 seconds. During the sonication process, the amplitude setting can be between 70-100%. In one embodiment, the amplitude setting can be approximately 75%.

At step 336, the dried blood sample is removed from the vessel and can be discarded, yielding a final sample.

At step 338, a portion or all of the final sample from step 336 from a particular vessel can then be analyzed by LC-MS and/or LC-MS/MS in a negative ionization mode to detect the presence, absence and/or quantity of a plurality of different analytes in the dried blood sample. In various embodiments, the negative ionization mode of the LC-MS and/or LC-MS/MS process can simultaneously determine the presence or absence of at least 2 analytes in the dried blood sample. In various non-exclusive alternative embodiments, utilizing the method(s) outlined herein, the negative ionization mode of the LC-MS and/or LC-MS/MS process can simultaneously determine the presence or absence of at least 4, 5, 6, 7, 8, 9, 10, 11, 12, 13, 14, 15, 16 or greater than 16 analytes in the dried blood sample. Using the methodology provided herein, a ratio of the number of analytes for which the presence or absence is being determined to the volume (in μL) of blood from which the dried blood sample was obtained can be at least approximately 2:5. In non-exclusive alternative embodiments, the ratio of the number of analytes for which the presence or absence is being determined to the volume (in μL) of blood from which the dried blood sample was obtained can be at least approximately 4:5, 2:1, 3:1 or 5:1.

In certain embodiments, the LC-MS and/or LC-MS/MS process can yield evidence of the presence or absence of any single analyte, any combination of analytes, or all of the analytes listed and/or described herein during a single LC-MS and/or LC-MS/MS analysis. The analytes present in the final sample can be determined by any suitable method, including, but not limited to, consulting a lookup table, printouts from the LC-MS and/or LC-MS/MS process, appropriate software, etc.

The volume of the final sample that is needed for LC-MS and/or LC-MS/MS can vary. In various embodiments, the volume of the final sample that is needed is dependent upon the number of analytes being detected and/or analyzed during the LC-MS and/or LC-MS/MS process. For example, in one embodiment, a ratio of the number of analytes to the volume of a portion of the final sample (in μL) that is used during a single LC-MS and/or LC-MS/MS analysis is at least approximately 1:2. In non-exclusive, alternative embodiments, the ratio of the number of analytes to the volume of the portion of the final sample (in μL) that is used during a single LC-MS and/or LC-MS/MS analysis can be less than approximately 1:2. Still alternatively, the ratio of the number of analytes to the volume of the portion of the final sample (in μL) that is used during a single LC-MS and/or LC-MS/MS analysis can be less than approximately 1:3, 1:4 or 1:5, or greater than approximately 1:1, 2:1 or 3:1. Thus, a relatively large number of analytes can be analyzed during the LC-MS and/or LC-MS/MS process using a relatively small volume of the final sample from step 336. In this manner, numerous retests or reruns of step 338 can occur, if necessary.

Figure 4:
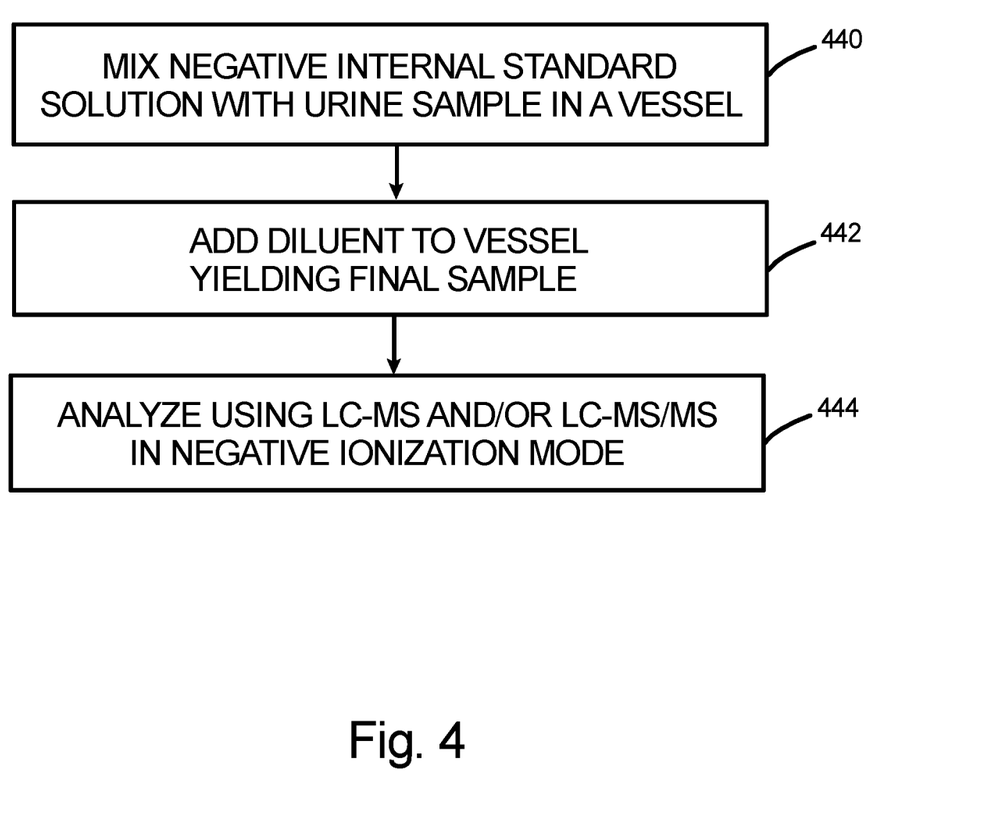
FIG. 4 is a flow chart showing another embodiment of a method for qualitative and quantitative multiplexing of drug analytes from a urine sample using a negative ionization mode during mass spectrometry.

FIG. 4 is a flow chart showing another embodiment of a method for qualitative and quantitative multiplexing of drug analytes from a urine sample using a negative ionization mode during the LC-MS and/or LC-MS/MS analysis. It is recognized that in certain embodiments, various steps illustrated and described with respect to FIG. 4 can be omitted without deviating from the scope of the disclosure herein. It is further recognized that in some embodiments, additional steps can be included in the method shown in FIG. 4 that are not illustrated and described. In one embodiment, the specific drug analytes can include one or more of the following 16 analytes: Amobarbital, Phenobarbital, Pentobarbital, Butalbital, Butabarbital, Secobarbital, Ethyl Sulfate, Ethyl-β-D-glucuronide, Valproic Acid, Chlorothiazide, Furosemide, Hydrochlorothiazide, Lisinopril, Oxipurinol, Ezetimibe and/or Ibuprofen.

In certain non-exclusive embodiments, the method for qualitative and quantitative multiplexing of drug analytes from a urine sample can include one or more of the following steps.

At step 440, a negative Internal Standard solution (also sometimes referred to herein as "Internal Standard solution") and a urine sample are added to one another in a vessel, such as a 1.2 mL test tube as one representative, non-exclusive example. The preparation of the negative Internal Standard solution can be substantially similar or identical to preparation of the Internal Standard solution previously described relative to step 330 in FIG. 3.

The number of negative Internal Standards included in the negative Internal Standard solution can vary depending upon the number and type of analytes being tested in the urine sample. For example, in certain tests that include at least 10 analytes being tested simultaneously, a ratio of the number of analytes being tested to the number of negative Internal Standards in the negative Internal Standard solution can be approximately 2:1. In non-exclusive alternative embodiments, the ratio of the number of analytes being tested to the number of negative Internal Standards in the negative Internal Standard solution can be approximately 2:1, or the ratio can be greater than approximately 2:1 or less than approximately 2:1.

The ratio of the volume of the Internal Standard solution and the urine sample can vary. In one embodiment, the ratio of the volume of the Internal Standard solution and the urine sample can be approximately 1:1. However, in non-exclusive alternative embodiments, the ratio of the volume of the Internal Standard solution and the urine sample can be greater than approximately 1:1, 2:1, 3:1, 4:1 or 5:1. Still alternatively, the ratio of the volume of the Internal Standard solution and the urine sample can be less than approximately 1:1, 1:2, 1:3, 1:4 or 1:5.

At step 442, a diluent is added to the mixture of the negative Internal Standard solution and the urine sample from step 440 to form a final sample. In various embodiments, the diluent can be a solution that includes water and methanol. In one embodiment, the water that is used can be HPLC-grade water. Additionally, or in the alternative, the methanol that is used can be HPLC-grade methanol. The ratio of the volume of water to the volume of methanol in the diluent can vary. In one embodiment, the ratio of the volume of water to the volume of methanol in the diluent can be approximately 1:1. However, in alternative embodiments, the ratio of the volume of water to the volume of methanol in the diluent can be greater than approximately 5:1, 4:1, 3:1, 2:1 or 1:1. In other alternative embodiments, the ratio of the volume of water to the volume of methanol in the diluent can be less than approximately 1:5, 1:4, 1:3, 1:2 or 1:1. Still alternatively, the diluent can comprise compounds other than a mixture of water and methanol.

Further, the relative volumes of the mixture of the negative Internal Standard solution and the urine sample on the one hand, and the diluent on the other hand, can be varied. In one embodiment, the volume of the mixture of the negative Internal Standard solution and the urine sample can be approximately 25% of the volume of diluent that is added. For example, in one non-exclusive embodiment, 20 µL of the negative Internal Standard solution can be added together with 20 µL of the urine sample and 160 µL of the diluent to make a total of approximately 200 µL in each vessel. However, it is recognized that the total volume can be varied as necessary. However, in alternative embodiments, the volume of the mixture of the negative Internal Standard solution and the urine sample can be greater or less than approximately 25% of the volume of diluent that is added.

At step 444, a portion or all of the final sample from step 442 from a particular vessel can then be analyzed by LC-MS and/or LC-MS/MS in a negative ionization mode to detect the presence and quantity of a plurality of analytes in the urine sample. In various embodiments, the negative ionization mode of the LC-MS and/or LC-MS/MS process can concurrently yield evidence of at least 2 analytes in the urine sample. In various non-exclusive alternative embodiments, utilizing the method(s) outlined herein, the negative ionization mode of the LC-MS and/or LC-MS/MS process can concurrently yield evidence of at least 4, 5, 6, 7, 8, 9, 10, 11, 12, 13, 14, 15, 16 or greater than 16 analytes in the urine sample. In certain embodiments, the LC-MS and/or LC-MS/MS process can yield evidence of the presence or absence of any single analyte, any combination of analytes, or all of the analytes listed and/or described herein during a single LC-MS and/or LC-MS/MS analysis. The analytes present in the final sample can be determined by any suitable method, including, but not limited to, consulting a lookup table, printouts from the LC-MS and/or LC-MS/MS process, appropriate software, etc.

The volume of the final sample that is needed for LC-MS and/or LC-MS/MS can vary. In various embodiments, the volume of the final sample that is needed is dependent upon the number of analytes being detected and/or analyzed during the LC-MS and/or LC-MS/MS process. For example, in one embodiment, a ratio of the number of analytes to the volume of a portion of the final sample (in µL) that is used during a single LC-MS and/or LC-MS/MS analysis is at least approximately 1:1. In non-exclusive, alternative embodiments, the ratio of the number of analytes to the volume of the portion of the final sample (in µL) that is used during a single LC-MS and/or LC-MS/MS analysis can be less than approximately 1:1. Still alternatively, the ratio of the number of analytes to the volume of the portion of the final sample (in µL) that is used during a single LC-MS and/or LC-MS/MS analysis can be less than approximately 1:2, 1:3 or 1:4, or greater than approximately 2:1, 3:1 or 4:1. Thus, a relatively large number of analytes can be analyzed during the LC-MS and/or LC-MS/MS process using a relatively small volume of the final sample from step 442. In this manner, numerous retests or reruns of step 444 can occur, if necessary.

It is understood that although a number of different embodiments of the method for qualitative and quantitative multiplexing of drug analytes from biological samples have been illustrated and described herein, one or more features of any one embodiment can be combined with one or more features of one or more of the other embodiments, provided that such combination satisfies the intent of the present invention.

While a number of exemplary aspects and embodiments of the method for qualitative and quantitative multiplexing of drug analytes from biological samples have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for preparation of a dried blood sample for multiplexing of analytes, the method comprising the steps of:
   mixing an Internal Standard solution with a first diluent in a vessel, the Internal Standard solution including a plurality of different Internal Standards;
   adding the dried blood sample to the vessel;
   sonicating the vessel containing the Internal Standard solution, the first diluent and the dried blood sample; and
   removing the dried blood sample from the vessel.

2. The method of claim 1 wherein the Internal Standard solution includes a plurality of Internal Standards.

3. The method of claim 1 wherein the Internal Standard solution includes at least 15 Internal Standards.

4. The method of claim 1 wherein the dried blood sample is generated using less than 50 µL of blood.

5. The method of claim 1 wherein the dried blood sample is generated using less than 10 µL of blood.

6. The method of claim 1 wherein the first diluent is methanol.

7. The method of claim 1 wherein the first diluent includes water and methanol.

8. The method of claim 7 wherein a ratio of the volume of the water to the volume of the methanol is less than 1:1.

9. The method of claim 1 further comprising the step of adding a second diluent to the dried blood sample.

10. The method of claim 9 wherein the second diluent is water.

11. The method of claim 9 wherein the volume of the second diluent is substantially similar to the volume of the first diluent.

12. The method of claim 9 wherein one of the diluents at least partially promotes protein precipitation.

13. The method of claim 9 wherein one of the diluents includes a compound that is selected from the group consisting of acetonitrile, ethanol, acetate, formic acid, water and methanol.

14. The method of claim 1 further comprising the step of analyzing at least a portion of the contents of the sonicated vessel to determine the presence or absence of hydroxychloroquine.

15. The method of claim 1 further comprising the step of analyzing at least a portion of the contents of the sonicated vessel to determine the presence or absence of at least 15 different analytes.

16. The method of claim 1 further comprising the step of analyzing at least a portion of the contents of the sonicated vessel using one of LC-MS and LC-MS/MS in a positive ionization mode.

17. The method of claim 1 further comprising the step of analyzing at least a portion of the contents of the sonicated vessel using one of LC-MS and LC-MS/MS in a negative ionization mode.

18. The method of claim 1 further comprising the step of analyzing at least a portion of the contents of the sonicated vessel to determine the presence or absence of a plurality of analytes, wherein a ratio of the number of analytes for which the presence or absence is being determined to the number of Internal Standards in the Internal Standard solution is at least approximately 2:1.

19. The method of claim 1 further comprising the step of analyzing at least a portion of the contents of the sonicated vessel to determine the presence or absence of a plurality of analytes, wherein a ratio of the number of analytes for which the presence or absence is being determined to the volume (in μL) of blood from which the dried blood sample was obtained is at least approximately 4:5.

20. The method of claim 1 wherein the volume of the Internal Standard solution can be less than approximately 10% of the volume of the first diluent.

21. The method of claim 1 wherein the volume of the Internal Standard solution can be greater than approximately 10% of the volume of the first diluent.

* * * * *